June 11, 1968  J. R. PLATE ET AL  3,387,862
TRACTOR HITCH WITH SWAY LIMITING MECHANISM
Filed Dec. 1, 1966  2 Sheets-Sheet 1
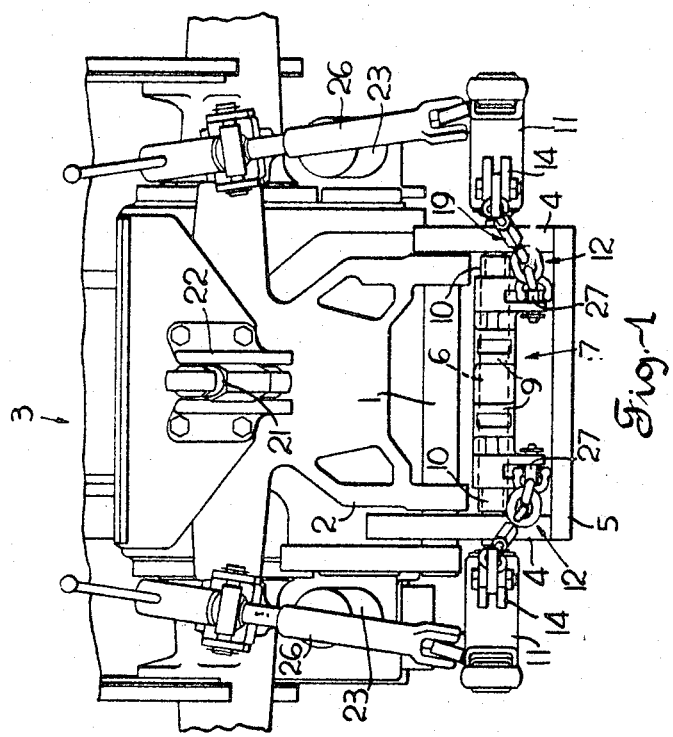
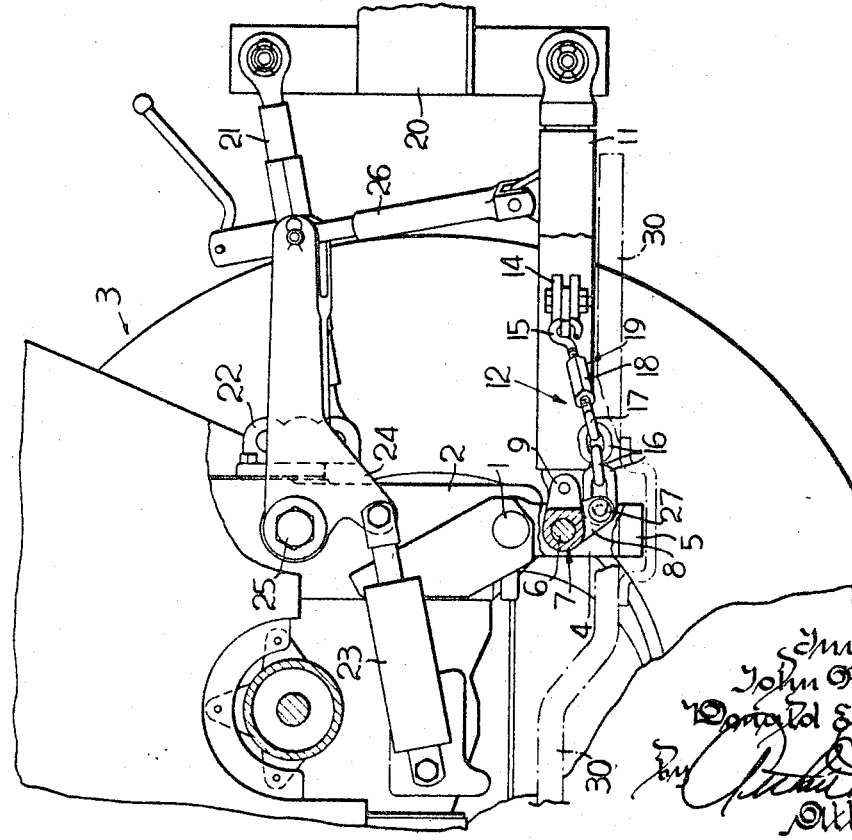

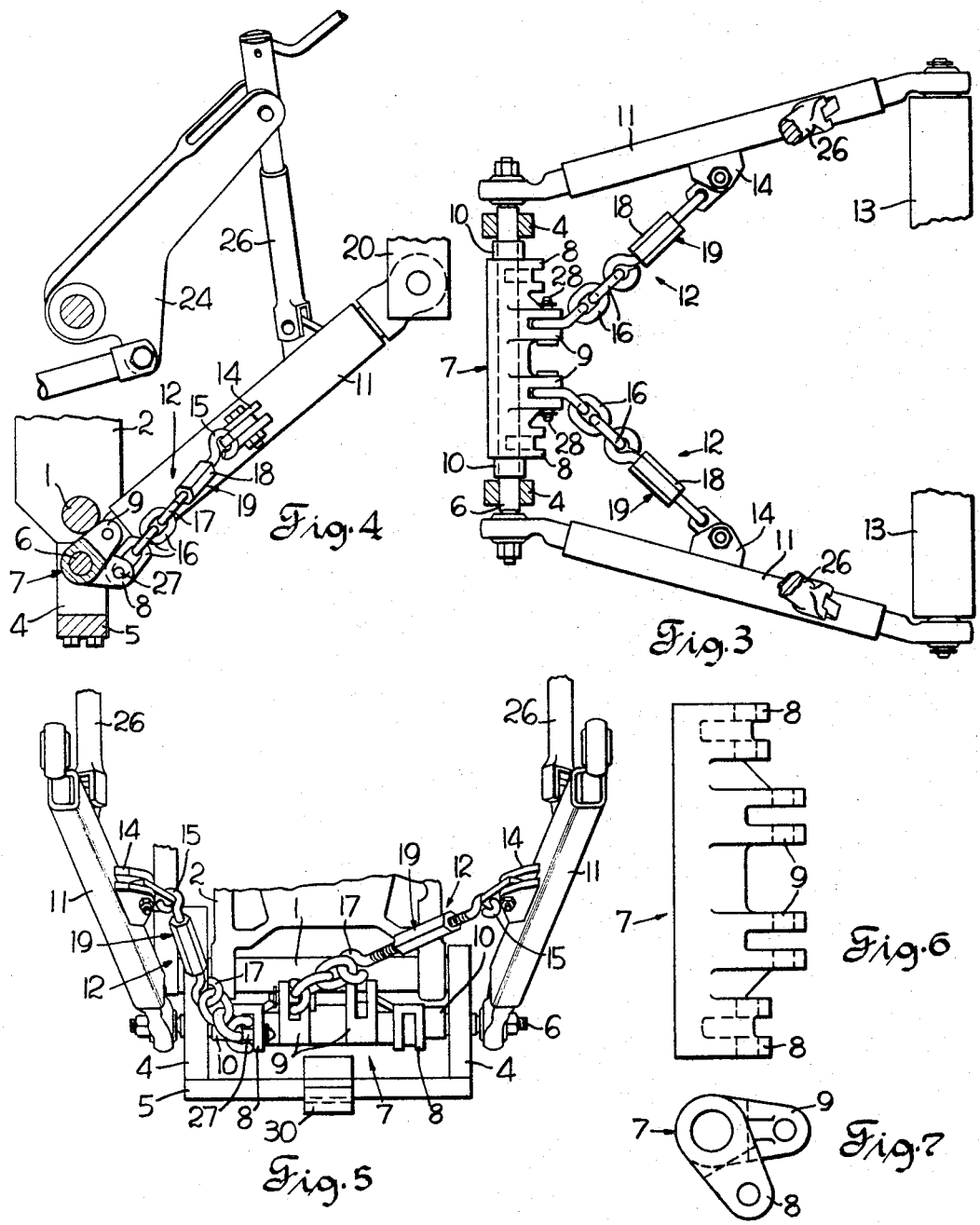

United States Patent Office 3,387,862
Patented June 11, 1968

3,387,862
TRACTOR HITCH WITH SWAY LIMITING
MECHANISM
John R. Plate, Milwaukee, and Donald E. Peterson,
Wauwatosa, Wis., assignors to Allis-Chalmers
Manufacturing Company, Milwaukee, Wis.
Filed Dec. 1, 1966, Ser. No. 598,343
8 Claims. (Cl. 280—461)

This invention relates to a tractor hitch and more particularly a sway limiting mechanism to control the sway of the draft members for pulling an implement.

Tractor implement hitches of the conventional three point type have provided a wide variety of mechanisms for limiting the lateral sway of the hitch linkage. Many of these sway limiting mechanisms have been costly in that they involve numerous extra parts and also require considerable time and effort to adjust to various operational requirements.

The sway limiting mechanism for a hitch must be sufficiently flexible to accommodate tractor mounted ground working implements and permit limited lateral movement independent of the tractor in their lower operating position to allow freedom of steering for the tractor. The sway mechanism must automatically eliminate lateral movement when the implement is raised to its inoperative transport position. This provides an integral effect of the mass of the implement with the tractor mass and holds the implement centered for satisfactory and safe travel of the implement and the tractor.

With other types of implements, it may be desirable to restrict lateral movement of the linkage and implement throughout its entire working range as well as in its raised transport position. Ideally, this should be accomplished by the same linkage with a minor number of parts and readjustment. The sway limiting mechanism should provide freedom of movement up and down throughout a working range. Also, this same linkage should be capable of being rendered inactive and held in a raised position so as not to cause an interference problem when the conventional swinging drawbar is being used.

Accordingly, these desirable objectives have been accomplished by this invention which provides a pair of diagonal tension members severally connected to a point on a rotating member supported on the tractor and singly connected to a pair of draft arms extending rearwardly from the tractor. When the draft arms are in their lower position, the diagonal tension members have a certain amount of slack to accommodate lateral movement of the draft arms. A conventional lift mechanism is used for lifting the draft arms causing the draft members and the diagonal tension members to initially rotate about a common axis. During the subsequent movement of the pivotal lifting of the draft arms, the draft arms continue to rotate about the same axis while the diagonal tension members rotate about a different axis which tightens the tension members and eliminates the possibility of lateral sway of the tractor hitch device and attached implement.

A further objective accomplished by the hitch device is to eliminate lateral movement in a working range of pivotal vertical movement of the hitch device when connected to mounted, semimounted and also trail behind implements. Sway must be reduced to an absolute minimum through the working range to maintain straightness of row, width of cut, etc., and yet provide freedom of pivotal movement in a vertical plane of the hitching device. This is particularly true when used with a weight transfer system.

An object of this invention is to provide a hitch mechanism to limit the lateral sway of an implement drawn by the tractor.

It is another object of this invention to permit limiting lateral sway of the implement in its operating position and eliminate lateral movement of the implement in its raised transport position.

It is a further object of this invention to provide a versatile hitch device which when adjusted will eliminate lateral sway throughout a working range.

It is a further object of this invention to provide a four sided hitch having universally pivoted connections on the draft arms and including two diagonal tension members to limit the lateral sway of the linkage in the lower position and to limit lateral sway of the linkage when in its raised position.

The objects of this invention are accomplished by providing a transverse shaft supported by a tractor providing a rotatable support for a sleeve having two pairs of clevis arms angularly spaced relative to each other. Two draft arms are universally pivoted to the extreme ends of the transverse shaft and connected on their rearward ends by a crossbar. A pair of tension members which may be at a variable length but operate to produce a tensile force of a predetermined length are severally connected to a pair of the clevis arms and singularly connected to an intermediate portions of the draft arms. A lift mechanism having a pair of links singularly connected to the intermediate portion of the draft arms provides a means for lifting the draft members to produce rotation of the draft arms and the tension members through a predetermined distance about a common horizontal axis initially and subsequently about different axes of rotation to create a tightening of the tension members and elimination of lateral sway of the hitch in its raised position. This permits limited lateral movement of the hitch to accommodate implement movement when in its operating position and eliminates lateral movement of an implement when in its raised transport position.

The hitch device also works in conjunction with a draft sensing device for distribution of the weight between the implement and the tractor wheels for optimum draft conditions. In this position the tension members are manually connected to the second pair of clevis arms. The tension members can be manually adjusted to provide the desired length in the tension members. In this position the tension members and the draft arms rotate throughout their pivotal movement about a common pivotal axis and accordingly eliminate any lateral sway of the hitch device throughout their working range. This is necessary for operation of semimounted implements such as plows, etc. The hitch is automatically pivoted in a vertical plane on a horizontal axis in response to the signal from the torsion bar sensing unit which controls a hydraulic system through suitable linkages to operate the weight transfer system.

Referring to the drawings, the preferred embodiment of the hitch device is illustrated.

FIG. 1 is a view illustrating the hitch device in its lower position;

FIG. 2 is a side view of the hitch device in its lower position and shows its connections with the tractor;

FIG. 3 is a plan view illustrating the hitch device positioned in its lower working range with the tension members shortened and connected to the center clevis arms;

FIG. 4 is a side view of the hitch device in its raised position;

FIG. 5 is a view of the hitch device in a position to accommodate free movement for the swinging drawbar;

FIG. 6 illustrates the sleeve formed integral with two pairs of clevis arms; and FIG. 7 is an end view of the sleeve illustrated in FIG. 6.

Referring to the drawings, a torsion bar 1 is mounted on the bracket 2 of the tractor 3. The torsion bar 1 is of the type illustrated and described in Patent No. 3,246,702. Although the draft mechanism for the tractor is connected in the manner shown, another mounting may be used.

The torsion bar 1 is connected to the crank arms 4 which are united on the bottom by a connecting bar 5. The torsion bar crank arms 4 pivotally support a transverse shaft 6. A sleeve 7 receives the transverse shaft 6 and is formed integrally with two pairs of clevis arms 8 and 9. A pair of spacers 10 each receives the transverse shaft 6 and are positioned intermediate the sleeve 7 and the crank arms 4.

The forward ends of a pair of draft arms 11 are universally pivoted on the ends of the transverse shaft 6. A pair of flexible tension members 12 are connected to the pair of clevis arms 8 on the sleeve 7. One of the pairs of tension members 12 is connected to a mating draft arm 11 on one side of the hitch device and a second tension member 12 is connected to a mating draft arm 11 on the opposite side of the hitch device.

The rearward ends of the draft arms are universally connected by a crossbar 13. A four-sided linkage is thereby formed by two draft arms 11, the transverse shaft 6, and cross bar 13. The draft arms 11 as shown in FIG. 3 are connected by a cross bar 13, however, the implement per se may be used to maintain the lateral spacing of the rearward ends of the draft members on some implements and thereby eliminating the need for the cross bar 13. The hitch device will operate satisfactorily without the cross bar 13 for this type of an implement.

In the normal operating position or lower position as illustrated in FIGS. 1 and 2, a predetermined amount of slack is present in the flexible tension members 12. The flexible tension members 12 are shown connected between a pair of clevis arms 8 and a clevis 14 on each of the draft members 11. The flexible tension member 12 consists of an eyebolt 15 connected to a link in the clevis 14 and a plurality of links 16 of which one is connected to the clevis 8. A second eyebolt 17 and eyebolt 15 forms a turnbuckle 19 with the trunnion 18. The turnbuckle 19 provides a means for presetting the degree of slack in each of the tension members 12.

FIG. 2 shows an implement 20 connected to the draft arms 11 and a connecting link 21 which is connected to the bracket 22 by means of a pin insert in one of the plurality of holes in the bracket and a similar hole in the connecting link 21.

The torsion bar crank arms 4 create a strain signal which is transmitted through a suitable mechanism to control the valve regulating the flow of hydraulic fluid. The flow of hydraulic fluid actuates the piston in the hydraulic cylinder 23 to operate the bell crank 24 on the rock shaft 25. The bell crank 24 is connected to a lift link 26 which in turn is connected to one of the draft arms 11. The lift links 26 as shown in FIG. 1 provide a means for lifting and lowering the draft arms 11. When operated in response to the strain signal, this mechanism will provide a means of controlling the distribution of weight between the tractor and the implement. When the implement is raised, it is accomplished through actuation of the hydraulic cylinder 23 and the bell crank 24 and lift links 26. FIG. 4 illustrates the hitch device in its raised position.

Sleeve 7 is pivoted about the transverse shaft 6 when the lift links 26 raise the draft arms 11. Initially, during the lifting operation, the members 12 and the draft arms 11 rotate about the axis of the transverse shaft 6. The common rotation movement of these members continues until the pair of clevis arms 9 engage the torsion bar 1 which stops the rotation of sleeve 7. The draft arms 11 continue to rotate about the axis of the transverse shaft 6 while the members 12 rotate about the common axis of the connecting pins 27 which connect the members 12 to the clevis arms 8. As the draft arms 11 continue to raise, a tightening of the members 12 is effected which eliminates lateral movement of the draft arms 11 when they are in their raised position as shown in FIG. 4.

If it is desired to eliminate lateral sway in the operating range, this is possible by removing the ends of the flexible members 12 from the clevis arms 8 and connecting these ends of members 12 by means of pins 28 to the clevis arms 9. A rotation of the trunnion 18 will give the necessary tension of the flexible members 12 to completely eliminate lateral sway of the draft members 11 throughout operating range if desired. This setting of the members 12 is shown in the plan view of the hitch device in FIG. 3.

FIG. 5 illustrates a means of lifting the clevis arms 8 and 9 to maintain clearance for the swinging drawbar 30 to swing on the crossbar 5. This is accomplished by positioning one of the members 12 so the end connected to the sleeve 7 is connected to the opposite inner clevis arm 9 as shown in FIG. 5. This may be accomplished by a manual disconnecting and connecting of the end of one of the members 12. The necessary adjustment of the turnbuckle 19 is accomplished by rotation of the trunnion 18.

The operation of the tractor hitch device will be described in the following paragraphs. The members 12 are connected to the clevis arms 8 of sleeve 7 in a manner to provide the necessary slack in the members 12 to accommodate lateral movement of the implement in its operating position. This provides for a limited lateral movement of the implement and permits freedom for steering of the tractor. This position is generally used for a harrow or such ground working implement.

When the implement is raised to the transport position, the lateral sway of the hitch device must be eliminated simultaneously with the lifting of the implement. This is accomplished by raising of the implement 20 by rotation of the rock shaft 25 and the bell cranks 24. Initially, the members 12 and the draft arms 11 rotate about the axis of the transverse shaft 6. The common rotation of these two members continues until the pair of clevis arms 9 engage the torsion bar 1. The sleeve 7 is prevented from further rotation in this direction but the draft arms 11 continue to rotate causing a pivoting of the members about the axis of the connection with the clevis arms 8. This in turn causes a tightening of the members 12 which continues until the members are taut. In this position the members are both under tension and no lateral sway is permitted of the tractor hitch device as shown in FIG. 4. This is the raised position for the tractor hitch device and also for the implement carried by the hitch device.

FIG. 5 illustrates a manual connection on one of the members 12 to the opposite clevis arm 9 on the sleeve 7 which maintains a lifted and rotated position of the sleeve and clevis arms on the sleeve to provide clearance for the swinging drawbar.

The lateral sway of the tractor hitch device in its operating range may be adjusted as shown in FIG. 3 by connecting the forward ends of the members 12 to the clevis arms 9 on sleeve 7 and setting the tension of members 12 by means of the turnbuckle 19. This setting may be used for certain types of implements where the hitch operates through a range and it is necessary to eliminate lateral movement to maintain control on the implement for straightness of row, etc.

The preferred embodiments of the invention have been illustrated and described. It is understood that other inventions may be devised which may fall within the scope of this invention which is defined by the attached claims.

The embodiments of the invention in which an exclusive property or privilege is claimed are defined as follows:

1. A tractor hitch device comprising, a pair of draft arms, means universally rotatably supporting the forward end of the said draft arms on a common horizontal axis of rotation, a pair of tension members singularly connected to the intermediate portion of said draft arms, pivotal means pivotally supported for limited pivotal movement on substantially the same horizontal axis of rotation and severally connecting said tension members for pivotal movement about another axis of rotation, lift means including links connected to said draft arms to pivotally raise said hitch device and causing said draft arms to pivot about said common horizontal axis and said tension members to pivot about said other axis of rotation and thereby cause a tensioning of said tension members and eliminate lateral sway when said hitch device is in the raised position.

2. A tractor hitch device as set forth in claim 1, wherein a crossbar is universally rotatably connecting the rearward ends of said draft arms.

3. A tractor hitch device as set forth in claim 1 wherein said tension members are also flexible and also have means for adjusting the length of said members.

4. A tractor hitch device as set forth in claim 1 wherein said pivotal means pivotally supported for limited pivotal movement is a sleeve having clevis arms for pivotally connecting said tension members.

5. A tractor hitch device as set forth in claim 1 wherein said pivotal means pivotally supported for limited rotational movement is a sleeve having two pairs of clevis arms formed integrally with said sleeve angularly spaced relative to each other, wherein one of said pairs of clevis arms limits the rotational movement of said sleeve and the other of said pairs of clevis arms provides a means for connecting said tension members.

6. A tractor hitch device as set forth in claim 1 wherein said pivotal means pivotally supported for pivotal movement is a sleeve having a pair of clevis arms formed integrally therewith connected with said tension members to eliminate sway and permit free pivotal movement of said device throughout the working range.

7. A tractor hitch device as set forth in claim 1 wherein said pivotal means pivotally supported for limited pivotal movement is a sleeve having two pairs of clevis arms formed integrally therewith angularly offset relative to each other, said tension members being attached to the first of said pairs of clevis arms and said second pair of said clevis arms operates to limit the pivotal movement of said sleeve to thereby cause said tension members and said draft members to initially pivot about said common axis of rotation and subsequently cause said tension members to pivot about the connection of said tension members and the first pair of said clevis arms to thereby eliminate sway at said hitch device by tightening of said tension members.

8. A tractor hitch device as set forth in claim 1 wherein a stop means is included and the pivotal means pivotally supported for limited rotational movement comprises a sleeve having two pairs of clevis arms angularly spaced relative to each other, the first of said pairs of clevis arms rotates to an engaging position with said stop means and the second set of clevis arms provides connection for said tension members, said lift means thereby providing rotation about different axes by said draft members and said tension members to thereby create a tensioning of said tension members and limiting the sway of said hitch device.

References Cited
UNITED STATES PATENTS

| | | | |
|---|---|---|---|
| 2,692,148 | 10/1954 | Bywater | 280—460 |
| 2,935,145 | 5/1960 | Du Shane et al. | 172—450 X |
| 3,078,930 | 2/1963 | Foote. | |
| 3,207,529 | 9/1965 | Harper | 172—450 X |
| 3,310,123 | 3/1967 | Abbott | 172—450 |

LEO FRIAGLIA, *Primary Examiner.*